US007802671B2

(12) United States Patent
Clarke et al.

(10) Patent No.: US 7,802,671 B2
(45) Date of Patent: Sep. 28, 2010

(54) APPARATUS FOR DELIVERING A CONTAINER TO A MARKING APPARATUS

(75) Inventors: Darcy O. Clarke, Kent, WA (US); James E. Torina, Issaquah, WA (US); Joel Butt, Portland, OR (US); Glenn Eastman, Federal Way, WA (US); Stephen Pawlawski, Manchester, WA (US)

(73) Assignee: Talyst Inc., Bellevue, WA (US)

( * ) Notice: Subject to any disclaimer, the term of this patent is extended or adjusted under 35 U.S.C. 154(b) by 746 days.

(21) Appl. No.: 11/621,066

(22) Filed: Jan. 8, 2007

(65) Prior Publication Data

US 2008/0023299 A1 Jan. 31, 2008

Related U.S. Application Data

(60) Provisional application No. 60/816,214, filed on Jun. 23, 2006.

(51) Int. Cl.
*B65G 37/00* (2006.01)
*B41F 17/00* (2006.01)

(52) U.S. Cl. .............. 198/346.2; 198/474.1; 198/475.1; 101/37

(58) Field of Classification Search .............. 198/346.2, 198/474.1, 475.1; 101/37, 39, 40
See application file for complete search history.

(56) References Cited

U.S. PATENT DOCUMENTS

| | | | | |
|---|---|---|---|---|
| 4,582,201 | A * | 4/1986 | Taniguchi et al. | 209/587 |
| 4,850,470 | A * | 7/1989 | Ferkany | 198/345.3 |
| 4,938,337 | A * | 7/1990 | Jowitt et al. | 198/377.03 |
| 4,969,551 | A * | 11/1990 | Heitmann et al. | 198/384 |
| 5,142,975 | A * | 9/1992 | Podalsky et al. | 101/40.1 |
| 5,451,130 | A * | 9/1995 | Kempf | 414/27 |
| 5,477,956 | A * | 12/1995 | Liebhart | 198/459.4 |
| 5,697,489 | A * | 12/1997 | Deonarine et al. | 198/464.4 |
| 6,485,711 | B1 * | 11/2002 | Olmstead | 424/58 |
| 6,499,270 | B2 * | 12/2002 | Peroni et al. | 53/53 |
| 7,150,213 | B2 * | 12/2006 | Bautz | 82/122 |
| 7,219,787 | B2 * | 5/2007 | Kabeshita et al. | 198/346.2 |

* cited by examiner

*Primary Examiner*—Douglas A Hess
(74) *Attorney, Agent, or Firm*—Christensen O'Connor Johnson Kindness PLLC

(57) ABSTRACT

An auto-feed assembly (102) for selectively transporting containers to a marking apparatus (100) is provided. The marking apparatus (100) includes a marking device for selectively applying a mark to a container (103). The auto-feed assembly includes a staging assembly (104) for processing a plurality of containers and a singulator assembly (112) in communication with the staging assembly (104) for isolating at least one container (103) from the plurality of containers. The auto-feed assembly (102) further includes a shuttle (210) disposed between the singulator assembly (112) and a portion of the marking apparatus (100), wherein the shuttle (210) is adapted for transporting the at least one container (103) to the portion of the marking apparatus (100).

26 Claims, 12 Drawing Sheets

APPARATUS FOR DELIVERING A CONTAINER TO A MARKING APPARATUS

CROSS-REFERENCE TO RELATED APPLICATION

This application claims the benefit of U.S. Provisional Application No. 60/816,214, filed on Jun. 23, 2006, the disclosure of which is hereby expressly incorporated by reference.

BACKGROUND

Bar coding in patient care and medication delivery is now mandated to administer patient dosing and prevent wrong dosing or inadvertent delivery of medication to the wrong patient. A labeling apparatus has been developed for delivering labels to medical containers, which is described fully in U.S. Patent Application Publication No. US 2005/0115681 A1, entitled "Method and Apparatus for Delivering Barcode-to-Dose Labels, filed on Aug. 13, 2004.

To use the aforementioned labeling apparatus, the user must manually feed the container into a portion of the apparatus, and the labeling apparatus thereafter delivers a label to the container. Thus, to deliver labels to a plurality of containers, each container must be individually fed into the apparatus, which is time-consuming and wasteful of resources.

SUMMARY

The present disclosure provides an auto-feed assembly for selectively transporting containers to a marking apparatus, wherein the marking apparatus includes a marking device for selectively applying a mark to a container. The auto-feed assembly comprises a staging assembly for processing a plurality of containers and a singulator assembly in communication with the staging assembly for isolating at least one container from the plurality of containers. The auto-feed assembly further includes a shuttle disposed between the singulator assembly and a portion of the marking apparatus, wherein the shuttle is adapted for transporting the at least one container to the portion of the marking apparatus.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
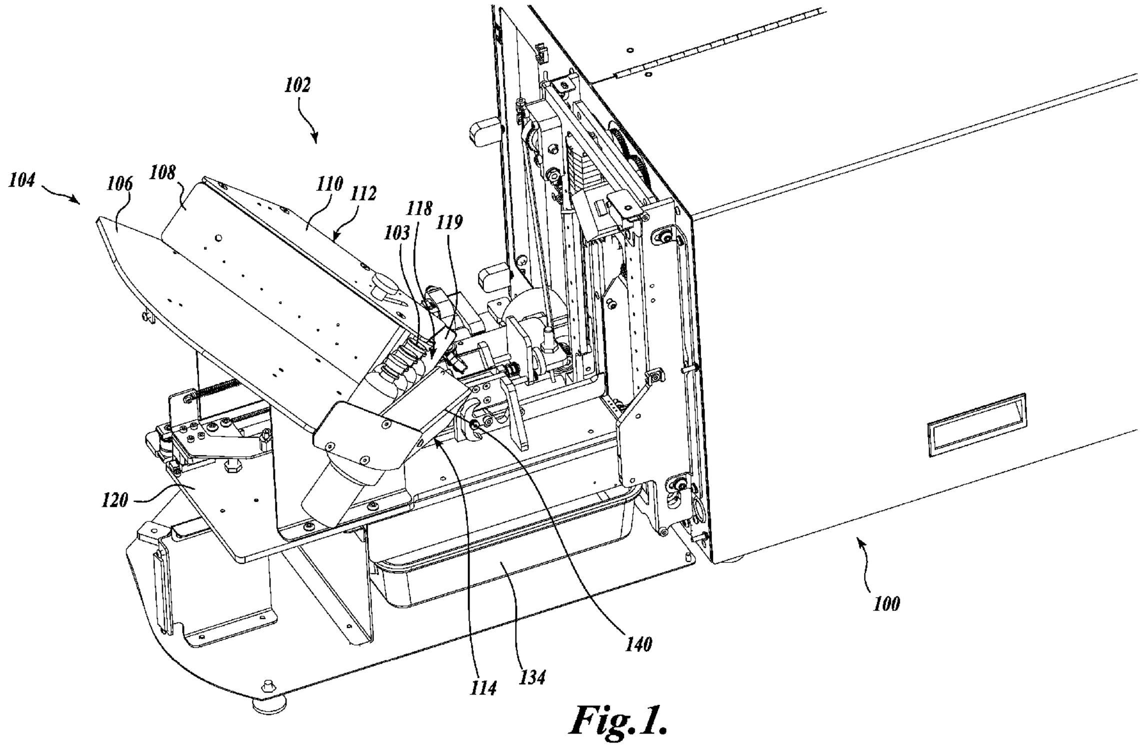
FIG. 1 is an isometric view of an auto-feed apparatus constructed in accordance with one embodiment of the present disclosure coupled to a labeling apparatus.

An auto-feed assembly, or auto-feed apparatus 102, constructed in accordance with one embodiment of the present disclosure is best seen by referring to FIG. 1. The auto-feed apparatus 102 delivers containers 103, which are preferably vials to a marking apparatus, or labeling apparatus 100. In turn, the labeling apparatus 100 applies a mark or label to the container 103. The labeling apparatus 100, and the method of delivering the labels to the containers 103, is described fully in U.S. Patent Application Publication No. US 2005/0115681 A1, entitled "Method and Apparatus for Delivering Barcode-to-Dose Labels, filed on Aug. 13, 2004, the disclosure of which is hereby expressly incorporated by reference. From time to time throughout this specification, directional terms, such as interior, exterior, top, bottom, etc., are used in the description of various components. It should be apparent that the use of such terms is merely for convenience and, as such, is not intended to be limiting.

The auto-feed apparatus 102 is supported on a mount plate 120, which is coupled to the labeling apparatus 100 in any well-known manner. A tray 134 is stowed beneath the mount plate 120 for receiving containers 103 that have been labeled by the labeling apparatus 100.

Figure 2:
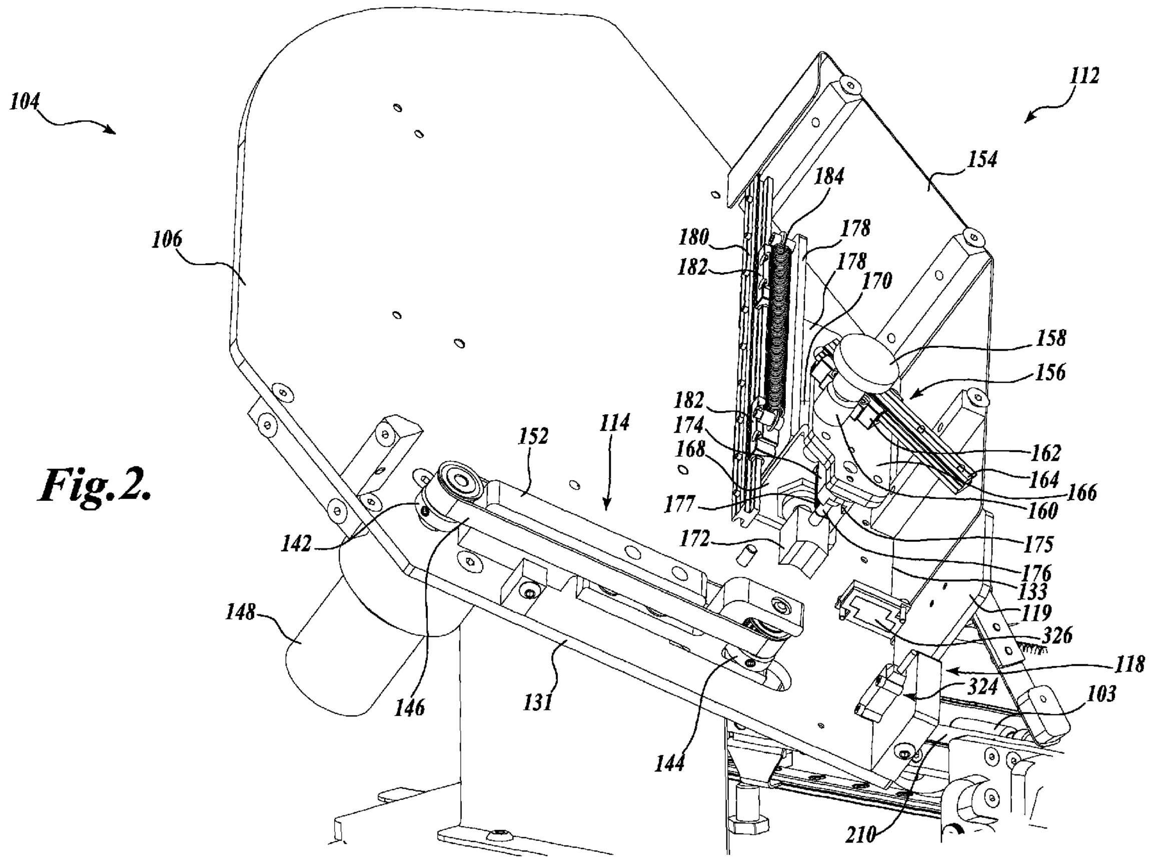
FIG. 2 is a partial isometric view of the staging assembly of the auto-feed apparatus of FIG. 1.

Referring to FIG. 2, the auto-feed apparatus 102 includes a staging assembly 104 positioned above the mount plate 120. The staging assembly 104 includes an infeed table 106 which is mounted to the mount plate 120 in any well-known manner such that the infeed table 106 is directed downwardly toward the labeling apparatus 100. The infeed table 106 includes first and second substantially straight edges 131 and 133.

A singulator assembly 112 and a drive assembly 114 are placed in communication with the staging assembly 104 for processing the containers 103. Preferably, the singulator assembly 112 is mounted to the infeed table 106 along at least a portion of the second straight edge 133, and the drive assembly 114 is mounted along the first straight edge 131. A gap is defined between the singulator assembly 112 and the drive assembly 114 along the second straight edge 131. This gap defines a feed channel 118 that is used to funnel containers 103 toward the lower corner of the infeed table 106 defined by the intersection of the first and second straight edges 131 and 133.

The singulator assembly 112 is enclosed within a singulator housing 155 having an L-shaped front cover 108 (see FIGS. 6A and 6B) and a singulator top cover 110. Referring to FIG. 2, a rail support 178 is mounted on the infeed table 106 inwardly of and substantially parallel to the second straight edge 133. First and second runner blocks 182 are mounted to the exterior surface of the vertical portion of the rail support 178.

A guide rail 180 is slidably received within the first and second runner blocks 182. As can best be seen by referring to FIGS. 6A and 6B, the guide rail 180 is mounted to the interior surface (not shown) of the front cover 108 so that the front cover 108 is linearly displaceable along the vertical portion of the rail support 178, as described in greater detail below.

Figure 6A:
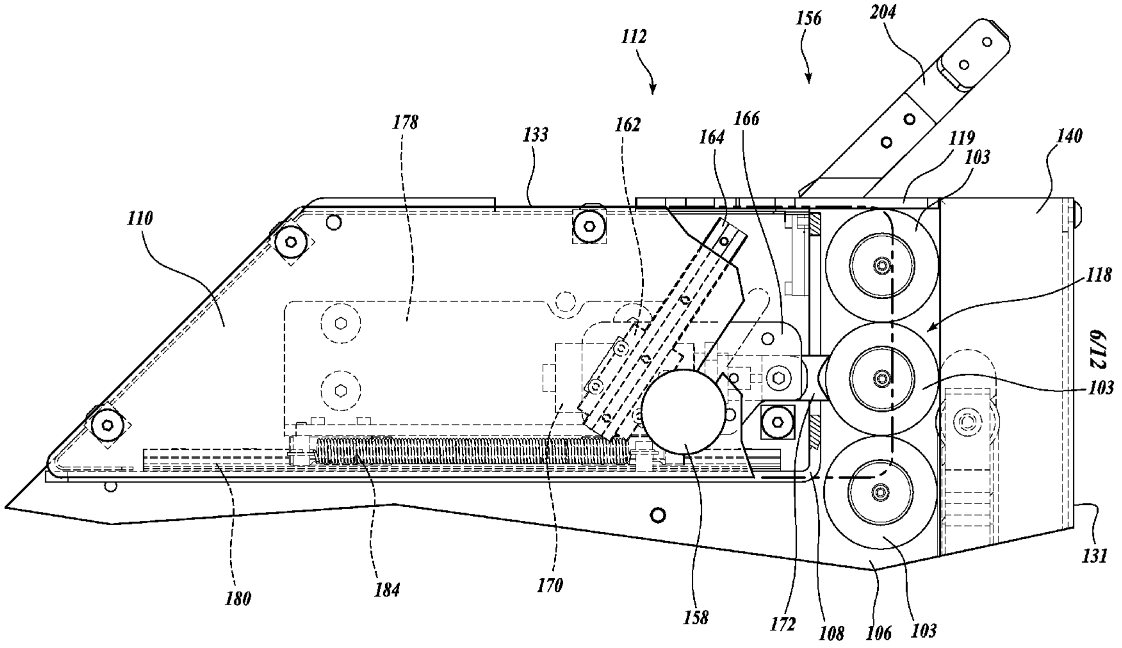
FIG. 6A is a top planar view of the singulator device of the auto-feed apparatus of FIG. 1 receiving a container of a first diameter.
Figure 6B:
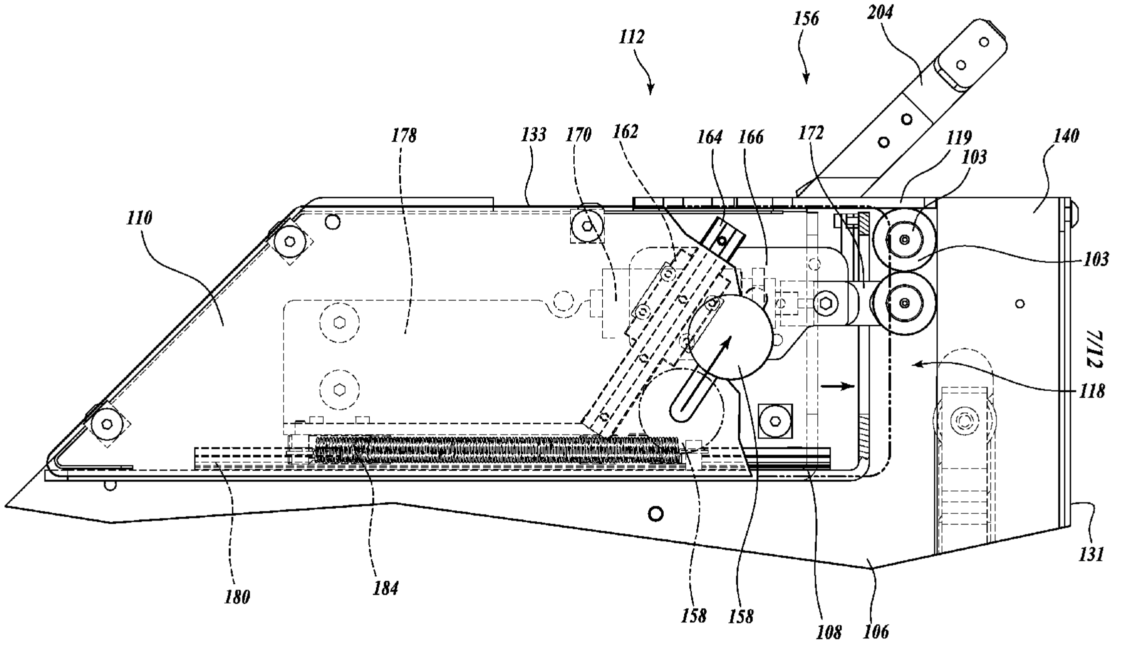
FIG. 6B is a top planar view of the singulator device of the auto-feed apparatus of FIG. 6A receiving a container of a second diameter.

Still referring to FIGS. 6A and 6B, an extension spring 184 is positioned along the exterior surface of the vertical portion of the rail support 178 above the guide rail 180. The extension spring 184 is mounted at one end to the exterior surface of the rail support 178 and at the other end to the interior surface of the longitudinal portion of the front cover 108. The extension spring 184 biases the front cover 108 in a direction opposite the first straight edge 131 of the infeed table 106 and therefore holds the shortened portion of the front cover 108 in tension against the adjustment mechanism 156 (described in detail below).

Referring back to FIG. 2, the singulator assembly 112 further includes a retention device 172 that protrudes through a horizontal slot in the shortened portion of the front cover 108 (not shown). The retention device 172 is selectively engageable with the body of a container 103 positioned within the feed channel 118 (see FIG. 1) for maintaining the position of said container 103 therewithin. The retention device 172 is operably coupled to an output push pole (not shown) of a single throw solenoid tubular push 170. A substantially L-shaped retention solenoid mount 168 mounted to the infeed table 106 along the edge of its vertical portion receives the forward end of the single throw solenoid tubular push 170. The vertical portion of the retention solenoid mount 168 is positioned adjacent and substantially orthogonal to the front end of the rail support 178.

The horizontal portion of the retention device solenoid mount 168 is positioned above the retention device 172 and includes a retention device guide 174 mounted therebeneath. A guide channel 175 is formed longitudinally along the bottom surface of the retention device guide 174. The guide channel 175 receives the upper end of a guiding shaft 176, and the lower end of the guiding shaft 176 is coupled to the top of the retention device 172. In this manner, when the retention device 172 is linearly translated by the single throw solenoid tubular push 170, it follows the path of the guiding shaft 176 within the guide channel 175. An extension spring 177 extends between the vertical portion of the retention device solenoid mount 168 and the guiding shaft 176. The extension spring 177 biases the retention device 172 towards the retention solenoid mount 168 when the retention device 172 is not linearly actuated by the single throw solenoid tubular push 170.

The singulator assembly 112 further includes an adjustment mechanism 156 for adjusting the position of the retention device 172 within the feed channel 118 and the linear position of the front cover 108. The adjustment mechanism 156 includes a retention bracket 166 which is mounted to the upper surface of the horizontal portion of the retention solenoid mount 168.

The adjustment mechanism 156 further includes a thumbscrew that passes through a longitudinal slot formed in singulator top cover 110 (See FIG. 1). After passing through the longitudinal slot, the thumbscrew shaft receives an annular spacer 160 and is thereafter threadably received within a threaded opening in the retention device bracket 166. The upper end of the thumbscrew includes an annular shoulder and an adjustment knob 158. As shown in FIGS. 1 and 2, the shoulder of the thumbscrew is larger in diameter than the width of the longitudinal slot such that the shoulder of the thumbscrew and the adjustment knob 158 are positioned on the exterior of the singulator top cover 110.

Still referring to FIG. 2, a runner block 162 is coupled to the upper surface of the retention device bracket 166 adjacent to spacer 160. The runner block 162 is slidably received on a guide rail 164, which is mounted to the bottom surface of the singulator top cover 110 (not shown).

The adjustment knob 158 is turned clockwise to drive the thumbscrew within the retention device bracket 166, and the singulator top cover 110 is clamped between the thumbscrew shoulder and the spacer 160. In this manner, the adjustment knob 158 and thumb screw cannot move relative to the singulator top cover 110. Therefore, the retention device solenoid mount 168, the single throw solenoid tubular push 170, and the retention device 172, which are coupled to the thumbscrew and adjustment knob 158 through the retention device bracket 166, are likewise locked in position relative to the singulator top cover 110.

When the adjustment knob 158 is loosened such that the singulator top cover 110 is no longer clamped between the thumbscrew shoulder and the spacer 160, the adjustment knob 158 can move within the longitudinal slot of the singulator top cover 110. Therefore, the retention bracket 166, the retention device solenoid mount 168, the single throw solenoid tubular push 170, and the retention device 172 are also moveable beneath the singulator top cover 110. The path of movement of the adjustment mechanism 156 is controlled through the slidable translation of the runner block 162 along the guide rail 164.

Referring to FIG. 1, the drive assembly 114 is housed within a drive housing 140 coupled to the infeed table 106. As can best be seen by referring to FIG. 2, the drive assembly 114 includes first and second timing pulleys 142 and 144. The first timing pulley 142 is operably coupled to the output shaft of a motor 148 mounted to the underside of the infeed table 106. Preferably, a permanent magnet DC motor 148 is used to selectively drive the first timing pulley 142. A longitudinal belt backer 152 is coupled to infeed table 106 and is positioned between the first and second timing pulleys 142 and 144.

Figure 3:
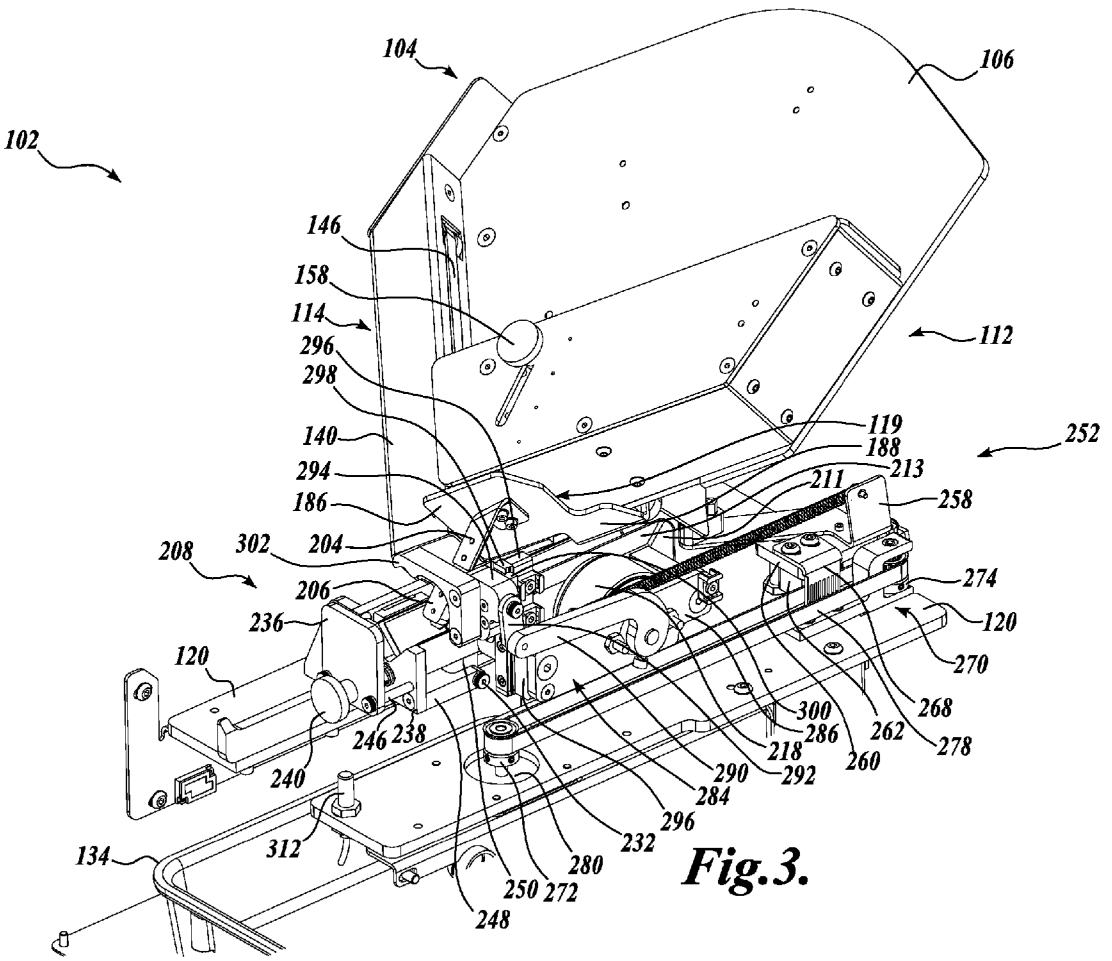
FIG. 3 is a front partial isometric view of the auto-feed apparatus of FIG. 1.

The first and second timing pulleys 142 and 144 are interconnected by a timing belt 146. As shown in FIG. 3, a portion of the timing belt 146 is exposed through a slot in the side of the belt drive housing 140 facing inwardly toward the infeed table 106. The timing belt 146 is engageable with containers 103 when they are loaded onto the infeed table 106 of the staging assembly 104, and the clockwise movement of the belt 146 urges the containers 103 downwardly toward the feed channel 118.

Referring to FIG. 1, a gate 119 is displaceable along the second straight edge 133 of the infeed table 106 in the gap between the singulator 112 and the drive assembly 114, or along the lower edge of the infeed channel 118. As shown in FIG. 3, the gate 119 includes a door portion 186 and a bracket portion 188. The door portion 186 is slideable along the bottom straight edge of the infeed table 106 and is positioned substantially perpendicular thereto.

Figure 4:
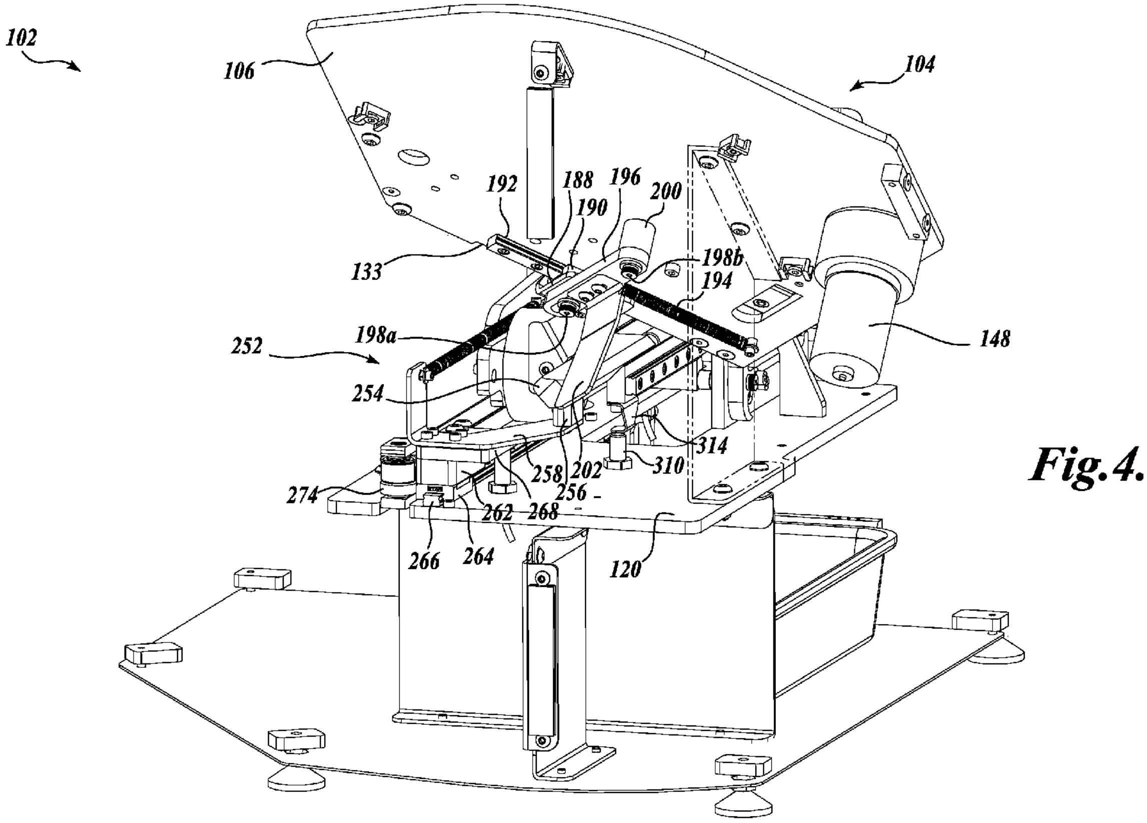
FIG. 4 is a rear partial isometric view of the auto-feed apparatus of FIG. 3.

Referring to FIG. 4, the bracket portion 188 curves downwardly towards the underside of the infeed table 106 such that it is substantially parallel to the bottom surface of the infeed table 106. The inner surface of the bracket portion 188 is coupled to the bottom of a runner block 190 which is slidably received on a guide rail 192. The guide rail 192 is secured to the underside of the infeed table 106 proximate to the second straight edge 133 and substantially parallel thereto.

The outer surface of the bracket portion 188 includes a flange bearing 198*a*, which is pivotally and slidably received within a slot formed in one end of a gate link 196. The gate link 196 extends inwardly from the bracket portion 188 of the door 119 toward the middle of the infeed table 106, and the second end of the gate link 196 is pivotally coupled to the infeed table through a flange bearing 198*b* and annular spacer 200. A link pusher plate 202 is coupled to the gate link 196 in between flange bearings 198*a* and 198*b*. The link pusher plate 202 extends downwardly and slightly outwardly from the gate link 196, and the rear surface of the link pusher plate 202 abuts the end of a linear push rod 254.

To displace the gate 119 along the second straight edge 133 of the infeed table 106 away from the first straight edge 131, thereby "opening" the bottom of the feed channel 118, the linear pushrod 254 is translated rearward to displace the link pusher plate 202 and cause the gate link 196 to rotate upwardly about flange bearing 198*b*. The upward rotation of the gate link 196 translates the bracket portion 188 and the runner block 190 upwardly and linearly along the guide rail 192. As a result, the door portion 186 of the gate 119 is slidably translated along the second straight edge 133 until the bottom of the feed channel 118 is open.

An extension spring 194 is coupled at one end to the runner block 190 and at the opposite end to the underside of the infeed table 106 near the first straight edge 131. When the pushrod 254 is translated forwardly within the shuttle 210 and is no longer engaging the link pusher plate 202, the extension spring 194 urges the bracket portion 188 to slide linearly along the guide rail 192 toward the first straight edge 131. At the same time, the door portion 186 is slidably translated along the second straight edge 133 of the infeed table 106 until the gate 119 is positioned along the bottom opening of the feed channel 118, thereby "closing" the gate 119.

Referring back to FIG. 3, a shuttle flap 204 is coupled to the exterior surface of the door portion 186 of the gate 119 and extends toward the mount plate 120. A weight 206 is coupled to the end of the shuttle flap 204 opposite the gate 119 to bias the shuttle flap 204 in a downward direction.

Still referring to FIG. 3, the auto-feed apparatus 102 includes a shuttle assembly 208 coupled to the mount plate 120 beneath the staging assembly 104. As can best be seen by referring to FIG. 5, the shuttle device 208 includes a shuttle 210. A shuttle guide 213 extends upwardly and outwardly from the edge of shuttle 210 (see FIG. 5) for guiding the containers 103 into the shuttle 210. A guide rail 212 is mounted to the shuttle 210 along its first side exterior surface. The guide rail 212 is slidably received within a horizontal runner block 214 mounted on its bottom surface to the mounting portion 218 of a vertical rotation cam path plate 216 of a camming device 215.

The rotation cam path plate 216 of the camming device 215 is vertically mounted along its bottom edge to the mount plate 120, and it extends from the forward portion of the shuttle 210 to the forward edge of the mount plate 120. The mounting portion 218 of the rotation cam path plate 216 is positioned adjacent to the forward portion of the shuttle 210, and a cam path portion 220 extends along the bottom of the rotation cam path plate 216 and forwardly of the mounting portion 218.

A slot is formed between the mounting portion 218 and the cam path portion 220 to define the proximal end of the cam path portion 220 and a cam surface 219, which extends along the upper edge of the cam path portion 220. A divot 221 is formed along the cam surface 219 beneath the forward end of the mounting portion 218. A substantially vertical lip 223 is formed along the cam surface 219 at the distal end of the cam path portion 220.

Figure 5:
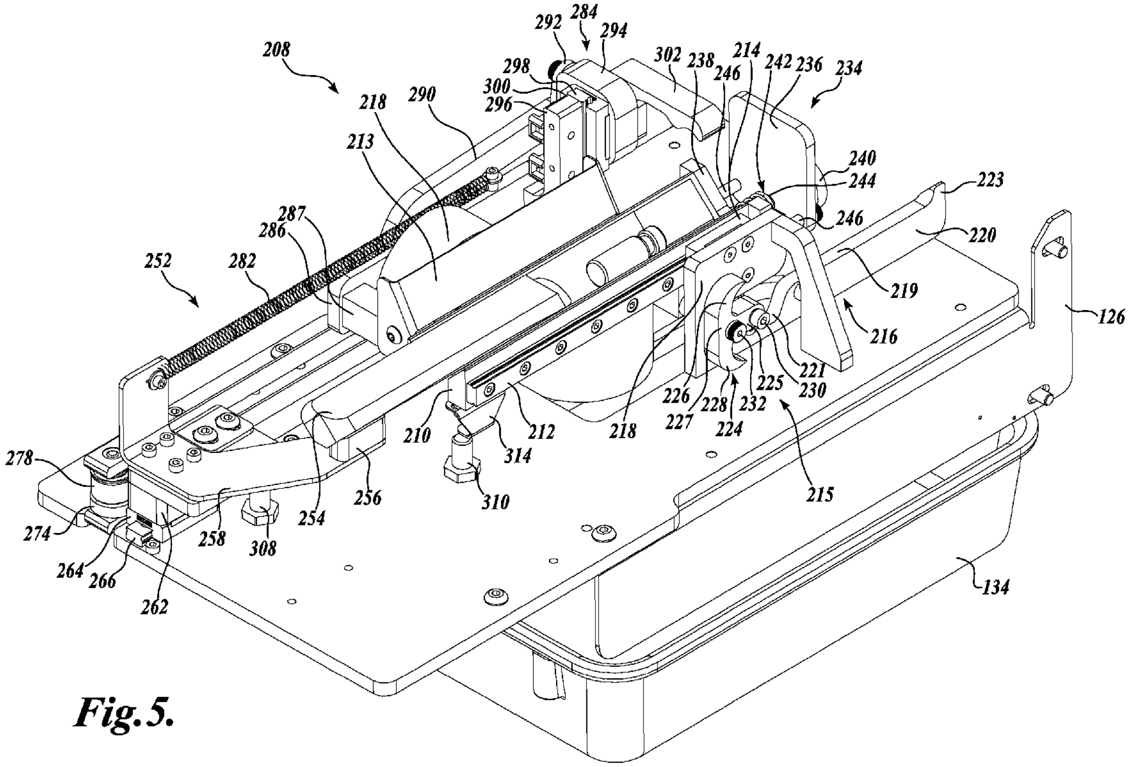
FIG. 5 is a front partial isometric view of the auto-feed apparatus of FIG. 3.

Still referring to FIG. 5, a mushroom-shaped rotator cam 224 is positioned adjacent and abutting the rotation cam path plate 216. The rotator cam 224 includes a stem 225 extending outwardly from a cap 227 having first and second weighted portions 226 and 228 formed on either side of the stem 225. The stem 225 is initially positioned horizontally adjacent the slot defined by the mounting portion 218 and the cam path portion 220 of the cam path plate 216. The cap 227 is positioned adjacent to the rear end of the rotation cam path plate 216 with the first weighted portion 226 being positioned above the second weighted portion 228.

Referring to FIGS. 3 and 5, the rotator cam 224 is coupled to an end stop 234, which is positioned adjacent the forward end of the shuttle 210. A thru-rod 230 extends orthogonally through the end of the stem 230 and is received into the side of a lower shuttle pivot plate 248 of the end stop 234. A shoulder screw 232 passes through the rotator cam 224 in the portion between the stem 225 and the cap 227 and is received into the rear end of the side of the lower shuttle pivot plate 248. A roller bearing 217 (shown hidden in FIGS. 8A and 8B) is axially disposed on the thru-rod 230 and engages the cam surface 219 so that the rotator cam 224 is linearly and rotatably translatable along the path defined by the cam surface 219.

Figure 8A:
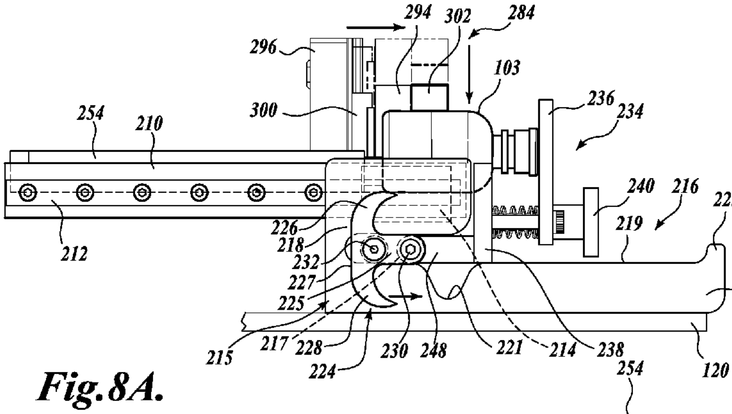
FIG. 8A is a side planar view of the shuttle, pushrod, end block, clamp assembly, and camming device of the auto-feed apparatus of FIG. 7B, showing the clamp of the clamp assembly lowered to engage the container.

Referring to FIGS. 3 and 8A, the end stop 234 includes a front shuttle pivot plate 238 that is vertically positioned adjacent the forward end of the shuttle 210 and includes a V-shaped recess along its upper edge that aligns the correspondingly shaped surface of the shuttle 210. The front shuttle pivot plate 238 extends downwardly from the shuttle 210, and the bottom edge of the shuttle pivot plate 238 is coupled to the front upper surface of the lower shuttle pivot plate 248. The upper surface of the lower shuttle pivot plate 248 is coupled to the bottom surface of a cradle pivot plate 250, which extends upwardly therefrom and is coupled to the underside of the shuttle 210.

An end block 236 is mounted parallel to the front shuttle pivot plate 238 via a thumbscrew 242 having an adjustment knob 240. A compression spring 244 is received onto the shaft of the thumbscrew 242 after it passes through the end block 236, and the thumbscrew 242 is thereafter received into a threaded opening in the front shuttle pivot plate 238. Preferably, at least two shoulder screws 246 are slidably received within the end block 236 at one end and are fixedly coupled at the other end to the front shuttle pivot plate 238 to help maintain the position of the end block 236 with respect to the front shuttle pivot plate 238.

Referring back to FIG. 5, the auto-feed apparatus 102 further includes a push rod assembly 252. The push rod assembly 252 includes a longitudinal push rod 254 that is receivable within the shuttle 210. The forward end of the push rod 254 is slidably received within the shuttle 210, and the rear end of the push rod 254 is coupled to a horizontal main shuttle bracket 258 through a push rod spacer 256. The rear portion of the main shuttle bracket 258 is coupled to the top of a runner block 264 with upper and lower shuttle rail spacers 260 and 262 disposed therebetween. The runner block 264 is slidably received on a guide rail 266, and the guide rail 266 is mounted lengthwise along the mount plate 120 laterally of the shuttle 210.

Referring specifically to FIG. 3, the push rod assembly 252 further includes a push rod drive assembly 270 coupled to the mount plate 120 laterally of the guide rail 266. The push rod drive assembly 270 includes a first pulley 272 and a second pulley 274 journaled for rotation on the mount plate 120 and interconnected by a timing belt 278. The first timing pulley 272 is operably coupled to a stepper motor 280 that is mounted to the lower surface of the mount plate 120.

The push rod drive belt assembly 270 is actuated to reciprocate the push rod 254 linearly within the shuttle 210. The shuttle rail upper spacer 260 is coupled to the belt drive 270 through a shuttle belt clamp 268. When the timing belt 278 is translated in either a clockwise or counterclockwise direction, the shuttle rail upper spacer 260 necessarily moves along with the belt 278, thereby translating the lower spacer 262 and the main shuttle bracket 258 linearly on the runner block 264 along the path defined by the guide rail 266. The linear translation of the main shuttle bracket 258 linearly translates the push rod 254 within the shuttle 210.

Still referring to FIG. 3, the auto-feed apparatus 102 further includes a clamp assembly 284 that raises and lowers a clamp 302 above the forward end of the shuttle 210. The clamp assembly 284 includes a solenoid mount bracket 286 that is positioned above the push rod drive belt assembly 271 and is coupled at its rear end to the shuttle 210 through a solenoid mount spacer 287 that extends therebetween. A rotary solenoid 288 is disposed between the solenoid mount bracket 286 and the shuttle 210. The rotary solenoid 288 is coupled to the interior surface of the solenoid mount bracket 286, and a rotary output arm 289 of the rotary solenoid 288 extends through an opening in the solenoid mount bracket 286.

A clamp arm 290 is operably coupled to the rotary output arm 289 of the rotary solenoid 288 and is positioned adjacent to the exterior surface of the solenoid mount bracket 286. The clamp arm 290 is coupled at one end to the rotary output arm 289 and extends outwardly and forwardly therefrom. The rotary solenoid 288 rotationally translates the clamp arm 290 about the axis defined by the output arm 289.

The second end of the clamp arm 290 is pivotally coupled to a first end of a clamp connector arm 292 that extends substantially vertically therefrom. The clamp connector arm 292 is pivotally coupled at its second end to the side of a clamp spacer 294, and the rear surface of the clamp spacer 294 is mounted to the top of a runner block 300. The runner block 300 is slidably received on a vertical guide rail 298 that is mounted to a vertical clamp rail mount 296. The clamp rail mount 296 is coupled to the interior surface of the solenoid mount bracket 286 on one side and to the exterior surface of the shuttle 210 on the other side.

A clamp 302 is mounted to the front surface of the clamp spacer 294. The clamp 302 extends outwardly from the spacer 294 so that it is positioned over the forward end of the shuttle 210. The clamp 302 is engageable with a container 103 when the clamp 103 is lowered down within the shuttle 210.

In operation, the rotary solenoid 288 is actuated to rotatably translate the clamp arm 290 in a clockwise or counterclockwise direction about the axis of the rotary output arm 289. In this manner, the clamp arm 290 thereby vertically translates the clamp connector arm 292, the clamp spacer 294, and the runner block 300 along the guide rail 298. The vertical translation of the clamp spacer 294 along the path defined by the guide rail 298 raises and lowers the clamp 302.

One end of an extension spring 282 is mounted to the solenoid mount bracket 286 and the other end is coupled to the main shuttle bracket 258. The spring 282 biases the clamp assembly 284 and the shuttle 210 (which are coupled together through the solenoid mount spacer 287 and the clamp rail mount 296) rearwardly toward the main shuttle bracket 258 of the pushrod drive assembly 252.

The auto-feed apparatus 102 and the labeling apparatus 100 share the same programmable logic controller (PLC) for controlling the automatic sequence of operations of each apparatus. The PLC receives digital input signals from a control panel (not shown) and a plurality of sensors mounted within each apparatus 102 and 100.

Referring to FIG. 2, a door closed sensor 326 is mounted to the infeed table 106 adjacent to the end of the feed channel 118. The door closed sensor 326 is OFF when the gate 119 is open and the door closed sensor 326 is ON when the gate 119 is closed. A feed sensor 324 is mounted to the infeed table 106 along the second bottom edge 133 within the drive housing 140. The feed sensor 324 senses whether a container 103 is adjacent to the door 119 and in position to be dropped down into the shuttle 210. If a container 103 is present, the feed sensor 324 is ON, and if a container 103 is not present, the feed sensor 324 is OFF.

Referring to FIG. 5, first, second, and third proximity switches 308, 310, and 312 are mounted to the mount plate 120. Preferably, inductive proximity switches or optical sensors are used; however, other switches may also be used without departing from the spirit and scope of the present disclosure. The first proximity switch, or pushrod back sensor 308 is positioned on the mount plate 120 below the shuttle rail upper spacer 260. The shuttle rail upper spacer 260 consists of a conductive material, such as steel, brass, aluminum, etc., that is detectable by the pushrod back sensor 308. The first proximity switch 308 detects the shuttle rail upper spacer 260 when the pushrod 254 is retracted within the shuttle 210. The pushrod back sensor 308 is ON when the pushrod 254 is retracted, and the pushrod back sensor 308 is OFF when the pushrod has been extended forward within the shuttle 210.

The second proximity switch, or shuttle home sensor 310 is positioned below the rear end of the shuttle 210. A shuttle back flag 314 is secured to the underside of the shuttle 210 at its rear end. The shuttle back flag 314 is also made of a conductive material such that it is detectable by the shuttle home sensor 310. The shuttle home sensor 310 is ON when the shuttle back flag 314 is detected and the shuttle home sensor 310 is OFF when the shuttle back flag 314 is not detected.

Referring to FIG. 3, the third proximity switch, or end shuttle travel sensor 312 is mounted on the mount plate 120 at its forward end on the side of the mount plate 120 having the push rod drive assembly 270. The end shuttle travel sensor 312 is positioned on the mount plate 120 along substantially the same linear path as the guide rail 266. The clamp rail mount 296, which is positioned above the guide rail 266, is sensed by the end shuttle travel sensor 312 when the clamp assembly 284 is translated forward along with the shuttle 210. The clamp rail mount 296 consists of a conductive material such that it may be sensed by the end shuttle travel sensor 312.

The end shuttle travel sensor 312 is ON when the clamp rail mount 296 is detected, and the end shuttle travel sensor 312 is OFF when it is not detected.

Referring to FIG. 6, a full tray sensor 318 is positioned below the mount plate 120 to sense when the tray 134 is filled with containers 103. When the tray 134 is full, the tray sensor 318 is ON, and when the tray 134 is not full, the tray sensor 318 is OFF.

Figure 7A:
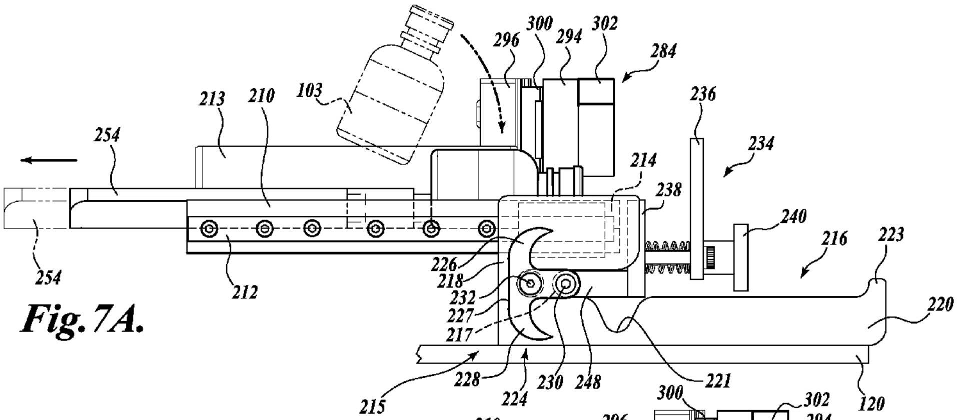
FIG. 7A is a side planar view of a shuttle, pushrod, end block, clamp assembly, and camming device of the auto-feed apparatus, wherein a container is disposed within the shuttle.
Figure 7B:
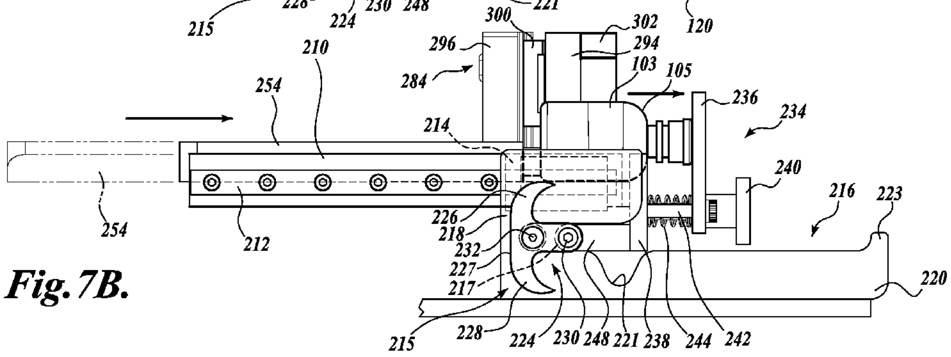
FIG. 7B is a side planar view of FIG. 7A, showing the pushrod and container translated within the shuttle.

To use the auto-feed apparatus 102, the auto-feed device 102 is first adjusted to fit the containers 103 that are to be fed into the labeling apparatus 100. Referring to FIGS. 7A and 7B, the adjustment mechanism 156 is used to simultaneously reposition the retention device 172 within the infeed channel 118 and to change the width of the infeed channel 118. To make the adjustments, two containers 103 are placed within the infeed channel 118. The adjustment knob 158 is turned counterclockwise until the singulator top cover 110 is no longer clamped between the thumbscrew shoulder and the spacer 160. Thereafter, the adjustment knob 158 is slidably translated within the longitudinal slot of the singulator top cover 110. Since the retention device 172 is indirectly coupled to the adjustment knob 158, the retention device 172 moves along the same path as the knob 158. The adjustment knob 158 is translated within the slot until the retention device 172 engages the second container 103 in the feed channel 118.

The linear movement of the adjustment knob 158 linearly translates the front cover 108 of the singulator housing 155. The shortened portion of the front cover 108 is held in tension against the forward edges of the retention device bracket 166 and the retention device guide 174. Therefore, the linear movement of the retention device bracket 166 and the retention device guide 174 (through the adjustment knob 158) translates the front cover 108 along the guide rail 180. The linear movement of the front cover 108 changes the orthogonal position of the shortened portion of the front cover 108 relative to the second straight edge 133 to increase or decrease the width of the feed channel 118. The width of the feed channel 118 needs to be adjusted so that smaller containers 103 will not enter the feed channel 118 side by side and so that larger containers 103 can fit within the feed channel 118.

Figure 8B:
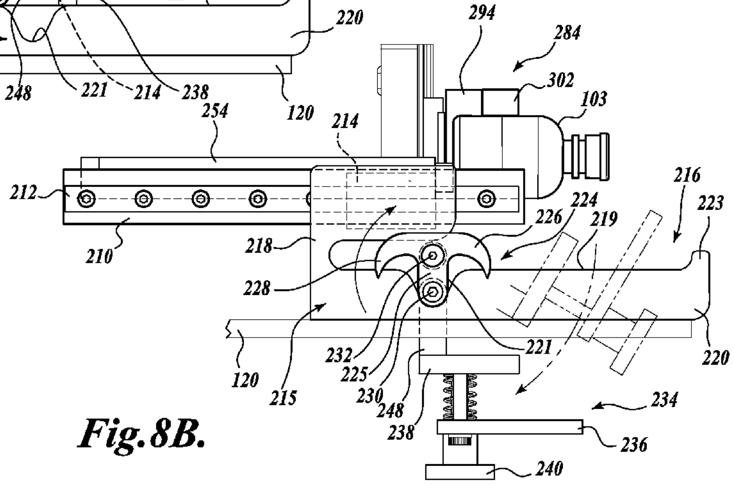
FIG. 8B is a side planar view of FIG. 8A, showing the shuttle, pushrod, end block, clamp assembly, and camming device of the auto-feed apparatus translated.

The end stop 234 is also adjusted so that a container 103 may be properly aligned within the shuttle 210 and delivered to the labeling apparatus 100 for labeling. Referring to FIG. 8B, a container 103 is placed within the forward end of the shuttle 210. Thereafter, the adjustment knob 240 is torqued to either drive or loosen the thumb screw 242 within the front shuttle pivot plate 238 and thereby translate the end block 236 closer to or further away from the front shuttle pivot plate 238. The end block 236 is translated by the adjustment knob 240 until the back surface of the end block 236 abuts the cap of the container 103 and the container shoulder 107 aligns the front surface of the front shuttle pivot plate 238. At this point, the shuttle 210 has been adjusted to receive the container 103.

Figure 9:
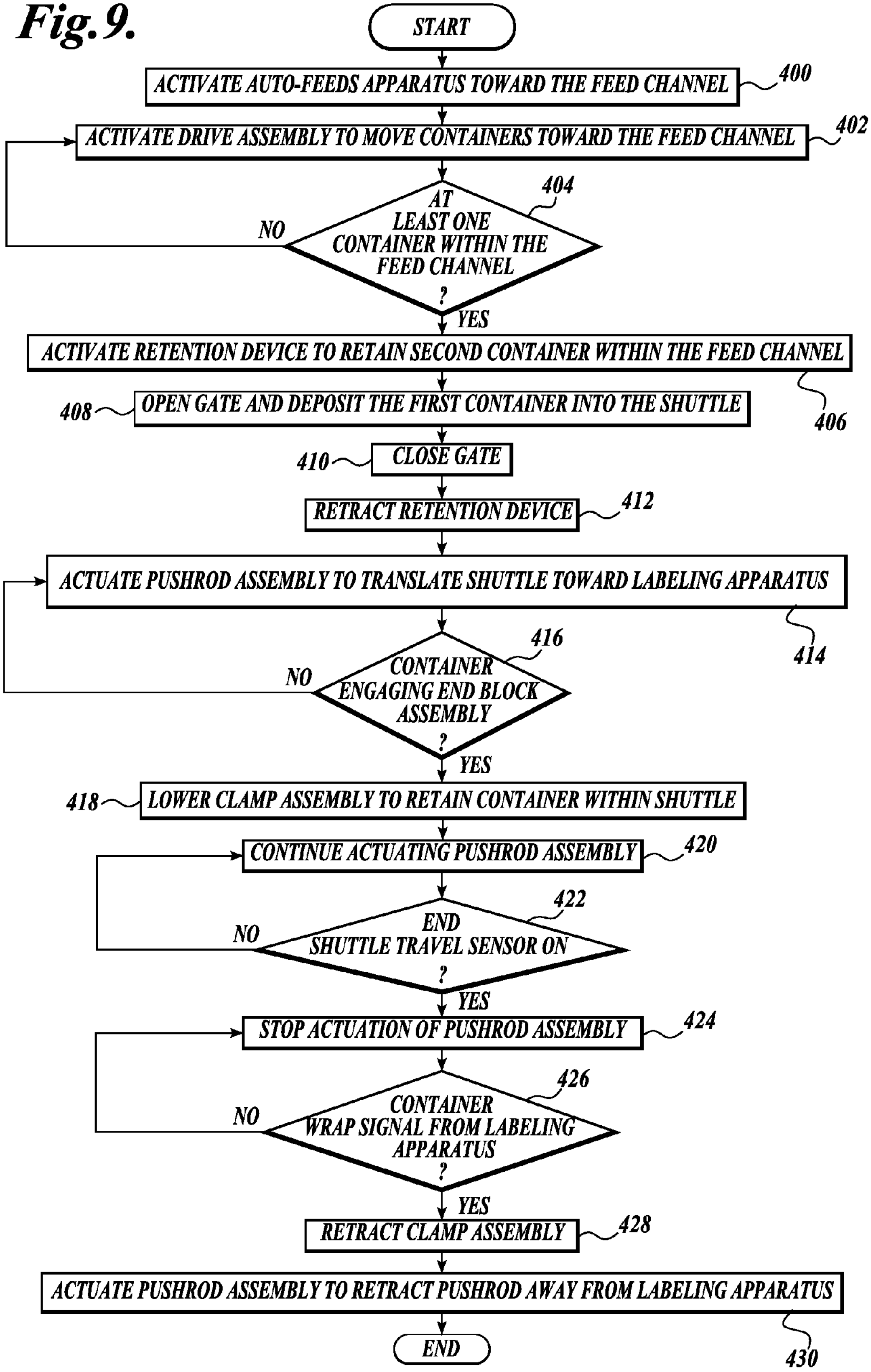
FIG. 9 is a block diagram showing a control schematic for the combination auto-feed apparatus and labeling apparatus of FIG. 1.

The general operation of the auto-feed apparatus 102 will be hereinafter described with reference to the sequence of operation set forth in FIG. 9. First, the auto-feed apparatus 102 is activated, as indicated by block 400. A plurality of containers 103 of generally the same size are loaded onto the infeed table 106. The containers 103 are gravitationally forced downwardly toward the feed channel 118. The timing belt 146 also engages the containers 103 and urges the containers 103 downwardly toward the feed channel 118, thereby preventing the clogging or bridging of containers 103, as indicated by block 402.

When a container 103 is sensed by the feed sensor 324, as indicated by decision block 404, the retention device 172 is actuated to engage the second container 103, as indicated by block 406. The retention device 172 retains the second container 103 within the feed channel 118 and isolates the first container from the remaining containers 103. The pushrod 254 is then translated rearwardly away from the shuttle 210 by the pushrod assembly 252 to open the gate 119, as indicated by block 408. With the gate 119 open, the first container 103 in the feed channel 118 is deposited into the shuttle 210, as shown in FIG. 7A.

After the container 103 is dropped down into the shuttle 210, the pushrod 254 is translated forwardly within the shuttle 210 to close the gate 119, as indicated by block 410. As the gate 119 closes, the shuttle flap 204 engages the body of the container 103 to stabilize the container 103 within the shuttle 210, as shown in FIG. 3. Once the gate 119 is closed, the retention device 172 is retracted and the second container 103 falls downwardly against the gate 119, as indicated by block 412. A new second container 103 falls in line behind the new first container 103, and the retention device 172 engages the new second container 103 to maintain its position within the feed channel 118. The process of depositing one container 103 into the shuttle 210 is repeated when the shuttle 210 is ready for another container 103.

Referring to FIG. 7B, the pushrod 254 continues to translate forwardly within the shuttle 210 and engages the bottom of the container 103, as indicated by block 414. The pushrod 254 translates the container 103 forwardly within the shuttle 210 until the cap of the container 103 abuts the end block 236, as indicated by decision block 416. When the container 103 is engages the end block 236, the clamp assembly 284 is activated to drop the clamp 302 down to engage the body of the container 103 to secure the container 103 within the shuttle 210, as shown in FIG. 8A and indicated by block 418. As the pushrod 254 continues to translate forwardly, as indicated by block 420, it also translates the shuttle 210, the container 103, the clamp assembly 284, the end block 234, and the rotator cam 224 forwardly together as one unit.

Referring to FIG. 8B, the rotator cam 224 travels forwardly along the rotation cam path plate 216 through the translation of the roller bearing 217 along the cam surface 219. The rotator cam 224 continues to travel along the cam surface 219 until the end of the stem 225, which houses the end of the thru-rod 230, drops into the divot 221. As the stem 225 and thru-rod 230 drop down into the divot 221, the weighted portions 226 and 228 of the rotator cam 224 drive the rotator cam 224 in a clockwise direction about the center axis of the thru-rod 230. This clockwise rotation of the rotator cam 224 also drives the clockwise rotation of the end block 234 about the center axis of the thru-rod 230. Although the end block 234 is no longer abutting the end of the container 103, the container 103 is held within the shuttle 210 by the clamp arm 302. Thus, the pushrod 254 continues to drive the shuttle 210, the container 103, the clamp assembly 284, the reciprocated end block 234, and the rotator cam 224 forward together as one unit.

Figure 8C:
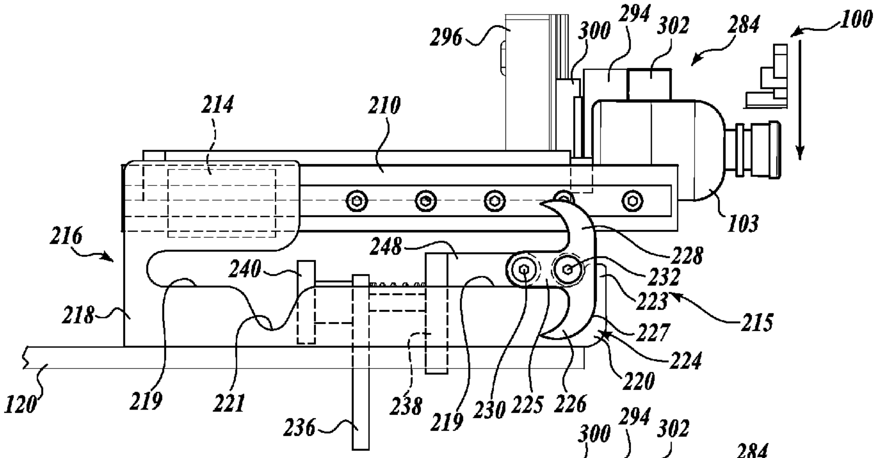
FIG. 8C is a side planar view of the shuttle, pushrod, end block, clamp assembly, and camming device of the auto-feed apparatus translated linearly forward so that the container is fed into the labeling apparatus.

Referring to FIG. 8C, as the rotator cam 224 continues to travel forward along the rotator cam path plate 216, the stem 225 is lifted out of the divot 221 by the clockwise rotation of the rotator cam 224. The rotator cam 224 rotates approximately 180 degrees about the center axis of the thru-rod 230 such that the end block 284 is maintained beneath the shuttle 210 in an overturned position.

The pushrod 254 continues to drive the shuttle 210, the container 103, the clamp assembly 284, the reciprocated end block 234, and the rotator cam 224 forward together as one unit until the rotator cam 224 abuts the lip 223 on the end of the cam path 219. At this point, the end shuttle travel sensor 312 is ON, as indicated by decision block 422, and the pushrod drive assembly 252 stops actuating the pushrod 254, as indicated by block 424. The container 103 is positioned within the labeling apparatus 100 so that a label 350 may be wrapped around the container 103, as shown in FIG. 8C. As discussed in more detail in U.S. Patent Application Publication No. US 2005/0115681 A1, a label 350 is applied to the container 103, as shown in FIGS. 8C and 8D, and the labeling apparatus 100 sends a container wrap signal, as indicated by decision block 426.

Figure 8D:
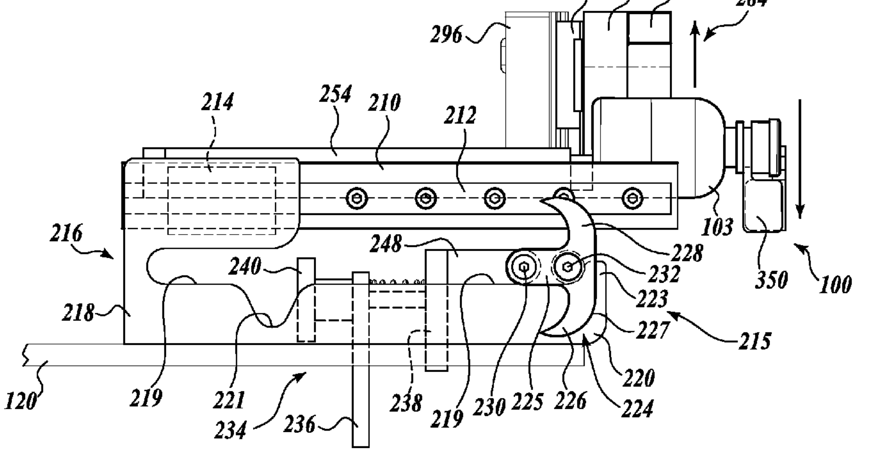
FIG. 8D is a side planar view of the shuttle, pushrod, end block, clamp assembly, and camming device of the auto-feed apparatus translated linearly forward, wherein the container is being labeled by the labeling apparatus.
Figure 8E:
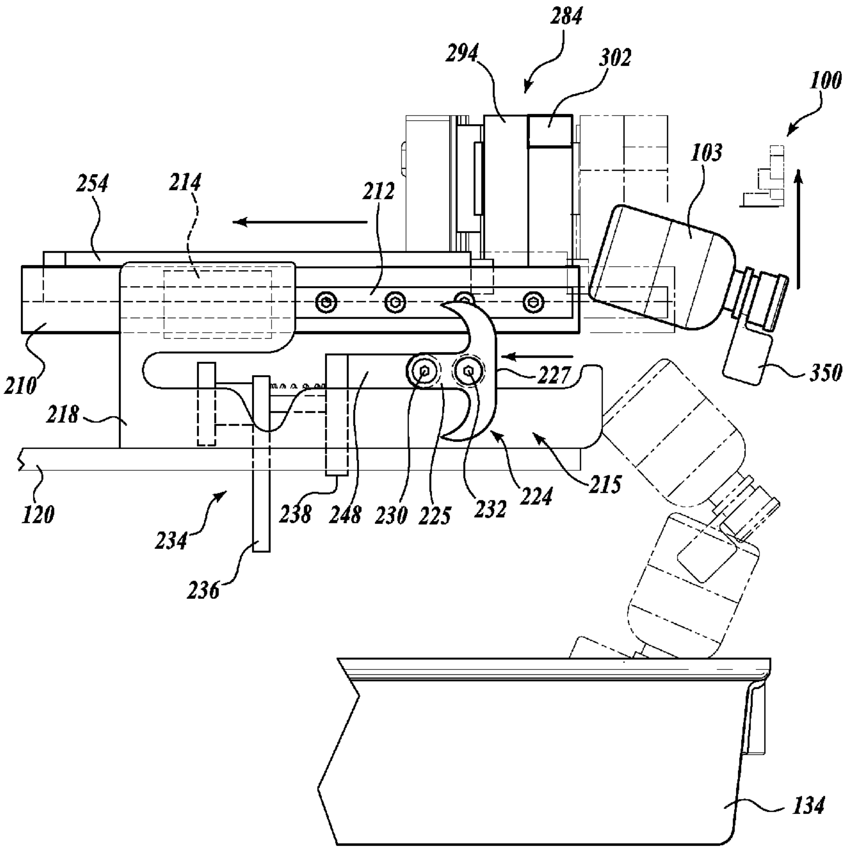
FIG. 8E is a side planar view of the shuttle, pushrod, end block, clamp assembly, and camming device of the auto-feed apparatus translating rearwardly and allowing the container to fall into a tray below.

As the label 350 is being secured to the container 103, the clamp assembly 284 lifts the clamp arm 302 to release the container 103, as shown in FIG. 8D and as indicated by block 428. The pushrod 254 is translated rearwardly by the pushrod drive assembly 252, as shown in FIG. 8E and as indicated by block 430. As the pushrod 254 is translated rearwardly, the shuttle 210 and clamp assembly 284 are pulled rearwardly by the extension spring 282. The container 103 is released from the labeling apparatus 100 and is dropped downwardly into the tray 234.

The rearward movement of the shuttle 210 causes the rotator cam 224 to travel rearwardly along the cam path 219. When the stem 225 enters the divot 221, the rotator cam 224 rotates counterclockwise about the center axis of the thru-rod 230, thereby rotating the thru-rod 230 and the end block 234 counterclockwise until the end block 234 abuts the front edge of the shuttle 210. Once the pushrod 254, the shuttle 210, the clamp assembly 284, the rotator cam 224, and the end block 234 are restored to their original positions, the shuttle 210 is ready to receive another container 103 so that the feeding process may be repeated.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a marking apparatus of the type having a marking device for selectively applying a mark to a container, an auto-feed assembly, comprising:

(a) a staging assembly for processing a plurality of containers;

(b) a singulator assembly in communication with the staging assembly for isolating at least first and second containers from the plurality of containers, the singulator assembly comprising:

(i) a feed channel sized and configured to receive the at least first and second containers;

(ii) a gate in communication with the feed channel and configured to selectively restrain the first container within the feed channel;

(iii) a retention device that is selectively actuatable between a retaining position, wherein the retention device is engaged with the second container received within the feed channel, and an open position;

(iv) an adjustment mechanism operably coupled to the retention device and configured to selectively change the size of the feed channel and the position of the retention device within the feed channel such that the singulator assembly is adapted for use with containers of at least first and second sizes; and (c) a shuttle disposed between the singulator assembly and a portion of the marking apparatus, the shuttle adapted for transporting the first container to the portion of the marking apparatus.

2. The auto-feed assembly of claim 1, further comprising a drive assembly in communication with the staging assembly for selectively moving the plurality of containers within the staging assembly.

3. The auto-feed assembly of claim 1, wherein the gate extends between the feed channel and the shuttle to selectively restrain the first container in the feed channel when the gate is in a first position, and releases the first container when the gate is in a second position.

4. The auto-feed assembly of claim 1, further comprising a pushrod assembly in communication with the shuttle for selectively translating the shuttle between the singulator assembly and the portion of the marking apparatus.

5. The auto-feed assembly of claim 1, further comprising a clamp assembly in communication with the shuttle and clamping the first container within the shuttle for transporting the first container to the marking apparatus during operational aspects of the auto-feed assembly.

6. The auto-feed assembly of claim 1, further comprising an end stop located near one end of the shuttle and positioned for aligning the first container within the shuttle.

7. The auto-feed assembly of claim 1, wherein the adjustment mechanism further comprises a moveable member defining a portion of the feed channel, the moveable member operably coupled to the retention device.

8. The auto-feed assembly of claim 7, wherein the adjustment mechanism and the retention device are at least partially enclosed within a housing.

9. The auto-feed assembly of claim 8, wherein the moveable member is defined by a portion of the housing.

10. The auto-feed assembly of claim 9, wherein the adjustment mechanism is configured to slide the moveable member in first and second directions to selectively change the size of the feed channel.

11. An auto-feed assembly for selectively transporting containers to a labeling apparatus, wherein the labeling apparatus includes a labeling device for selectively applying a label to the container, the auto-feed assembly comprising:

(a) a staging assembly for processing a plurality of containers;

(b) a singulator assembly in communication with the staging assembly, the singulator assembly including a retention assembly for isolating at least one container from the plurality of containers; and (c) a shuttle disposed between the singulator assembly and a portion of the labeling apparatus, the shuttle sized and configured to receive the at least one container in a first position near the singulator assembly, the shuttle slidable into a second position near the labeling apparatus;

(d) an end stop pivotally coupled to an end of the shuttle and configured for selective engagement with the at least one container received within the shuttle;

(e) a pushrod assembly in communication with the shuttle and selectively engageable with the at least one container received within the shuttle for translating the shuttle and the at least one container between the singulator assembly and the portion of the labeling apparatus.

12. The auto-feed assembly of claim 11, further comprising a feed channel in communication with the staging assembly for isolating the at least one container from the plurality of containers.

13. The auto-feed assembly of claim 12, wherein the retention assembly retains the at least one container within the staging assembly.

14. The auto-feed assembly of claim 13, wherein the retention assembly further comprises a retention device that is selectively actuatable between a retaining position, wherein the plurality of containers are restrained, and an open position.

15. The auto-feed assembly of claim 14, wherein the retention assembly further comprises a gate extending between the feed channel and the shuttle to selectively restrain the at least one container in the feed channel when the gate is in a first position, and releases the at least one container when the gate is in a second position.

16. The auto-feed assembly of claim 15, wherein the singulator assembly includes an adjustment mechanism that is selectively adjustable to change the positioning of the retention device within the feed channel.

17. The auto-feed assembly of claim 11, further comprising a clamp assembly in communication with the shuttle and clamping the at least one container within the shuttle for transporting the at least one container to the labeling apparatus during operational aspects of the auto-feed assembly.

18. The auto-feed assembly of claim 11, further comprising a camming device configured to selectively pivot the end stop about an end portion of the shuttle as the shuttle is moved between the first and second positions.

19. An auto-feed assembly for selectively transporting containers to a labeling apparatus, wherein the labeling apparatus includes a labeling device for selectively applying a label to the container, the auto-feed assembly comprising:

(a) a staging assembly for processing a plurality of containers;

(b) a singulator assembly in communication with the staging assembly for isolating at least first and second containers from the plurality of containers, the singulator assembly comprising:

(i) a feed channel sized and configured to receive the at least first and second containers;

(ii) a gate in communication with the feed channel and configured to selectively restrain the first container within the feed channel;

(iii) a retention device that is selectively actuatable between a retaining position, wherein the retention device is engaged with the second container received within the feed channel, and an open position;

(iv) an adjustment mechanism operably coupled to the retention device and configured to selectively change the size of the feed channel and the position of the retention device within the feed channel such that the singulator assembly is adapted for use with containers of at least first and second sizes;

(c) a shuttle disposed between the singulator assembly and a portion of the labeling apparatus, the shuttle sized and configured to receive the first container in a first position near the singulator assembly, the shuttle slidable into a second position near the labeling apparatus;

(d) an end stop pivotally coupled to an end of the shuttle and configured for selective engagement with the first container received within the shuttle for aligning the first container within the shuttle; and (e) a pushrod assembly in communication with the shuttle and selectively engageable with the first container received within the shuttle for translating the shuttle and the first container between the singulator assembly and the portion of the labeling apparatus.

20. The auto-feed assembly of claim 19, wherein the gate is configured to selectively restrain the first container in the feed channel when the gate is in a first position, and releases the first container when the gate is in a second position.

21. The auto-feed assembly of claim 19, further comprising a clamp assembly in communication with the shuttle and clamping the first container within the shuttle for transporting the first container to the labeling apparatus during operational aspects of the auto-feed assembly.

22. The auto-feed assembly of claim 19, wherein the adjustment mechanism further comprises a moveable member defining a portion of the feed channel, the moveable member operably coupled to the retention device.

23. The auto-feed assembly of claim 22, wherein the adjustment mechanism and the retention device are at least partially enclosed within a housing.

24. The auto-feed assembly of claim 23, wherein the moveable member is defined by a portion of the housing.

25. The auto-feed assembly of claim 24, wherein the adjustment mechanism is configured to slide the moveable member in first and second directions to selectively change the size of the feed channel.

26. The auto-feed assembly of claim 19, further comprising a camming device configured to selectively pivot the end stop about an end portion of the shuttle as the shuttle is moved between the first and second positions.

* * * * *